(12) United States Patent
Crain et al.

(10) Patent No.: US 8,867,883 B2
(45) Date of Patent: Oct. 21, 2014

(54) ZERO U FIBER DISTRIBUTOR, MPO FANOUT

(75) Inventors: Thomas Crain, Melissa, TX (US); Gil Ruiz, McKinney, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 239 days.

(21) Appl. No.: 13/433,898

(22) Filed: Mar. 29, 2012

(65) Prior Publication Data

US 2012/0251064 A1  Oct. 4, 2012

Related U.S. Application Data

(60) Provisional application No. 61/468,716, filed on Mar. 29, 2011.

(51) Int. Cl.
  *G02B 6/00* (2006.01)
  *G02B 6/44* (2006.01)
  *G02B 6/38* (2006.01)

(52) U.S. Cl.
  CPC ............ *G02B 6/4472* (2013.01); *G02B 6/3879* (2013.01)
  USPC .......................................... 385/135; 174/68.1

(58) Field of Classification Search
  CPC .............................. G02B 6/3879; G02B 6/4472
  USPC .......................................... 385/135; 174/68.1
  See application file for complete search history.

(56) References Cited

U.S. PATENT DOCUMENTS

| | | | |
|---|---|---|---|
| 4,976,510 A | | 12/1990 | Davila et al. |
| 5,125,060 A | * | 6/1992 | Edmundson .................. 385/100 |
| 6,764,221 B1 | * | 7/2004 | de Jong et al. .................. 385/55 |
| 6,869,227 B2 | * | 3/2005 | Del Grosso et al. ............ 385/71 |
| 7,105,743 B2 | | 9/2006 | Caveney |
| 7,120,347 B2 | * | 10/2006 | Blackwell et al. ............ 385/135 |
| 7,147,383 B2 | * | 12/2006 | Sullivan ......................... 385/59 |
| 7,184,635 B2 | * | 2/2007 | Livingston .................... 385/114 |
| 7,187,838 B2 | | 3/2007 | Feustel et al. |
| 7,218,828 B2 | | 5/2007 | Feustel et al. |
| 7,266,281 B1 | * | 9/2007 | Flatau ........................... 385/135 |
| 7,349,605 B2 | * | 3/2008 | Noonan et al. ................. 385/100 |
| 7,546,018 B2 | | 6/2009 | Hendrickson et al. |
| 7,893,356 B2 | * | 2/2011 | Garza et al. .................... 174/100 |
| 2005/0135767 A1 | * | 6/2005 | Diaz et al. ..................... 385/135 |
| 2005/0163448 A1 | * | 7/2005 | Blackwell et al. ............ 385/135 |
| 2006/0133736 A1 | * | 6/2006 | Sullivan ......................... 385/59 |
| 2006/0233506 A1 | * | 10/2006 | Noonan et al. ................ 385/134 |
| 2009/0196563 A1 | | 8/2009 | Mullsteff et al. |
| 2010/0126750 A1 | * | 5/2010 | Garza et al. .................... 174/100 |
| 2010/0303431 A1 | | 12/2010 | Cox et al. |
| 2010/0322576 A1 | * | 12/2010 | Rhoney et al. ................ 385/134 |
| 2010/0322580 A1 | * | 12/2010 | Beamon et al. ............... 385/135 |
| 2011/0038589 A1 | * | 2/2011 | Ruiz et al. ..................... 385/135 |

* cited by examiner

*Primary Examiner* — Peter Radkowski (74) *Attorney, Agent, or Firm* — Muncy, Geissler, Olds & Lowe, P.C.

(57) ABSTRACT

A breakout module includes a substantially cylindrical body having a first end face and an opposite, second end face. A multi-fiber port, like an MPO port, is provided within the first end face, or a cord having a multi-fiber connector, like an MPO connector, attached to its distal end exits the first end face. Plural duplex fiber ports are disposed within the second end face. A breakout cable is disposed within the body and connects the plural duplex fiber ports of the second end face to the multi-fiber port or connector associated with the first end face.

18 Claims, 12 Drawing Sheets

ZERO U FIBER DISTRIBUTOR, MPO FANOUT

This application claims the benefit of U.S. Provisional Application No. 61/468,716, filed Mar. 29, 2011, the entire contents of which are herein incorporated by reference.

BACKGROUND OF THE INVENTION

1. Field of the Invention

The present invention relates to communication cables. More particularly, the present invention relates to a module which fans out an MPO connection to six duplex LC ports.

2. Description of the Related Art

Figure 1:
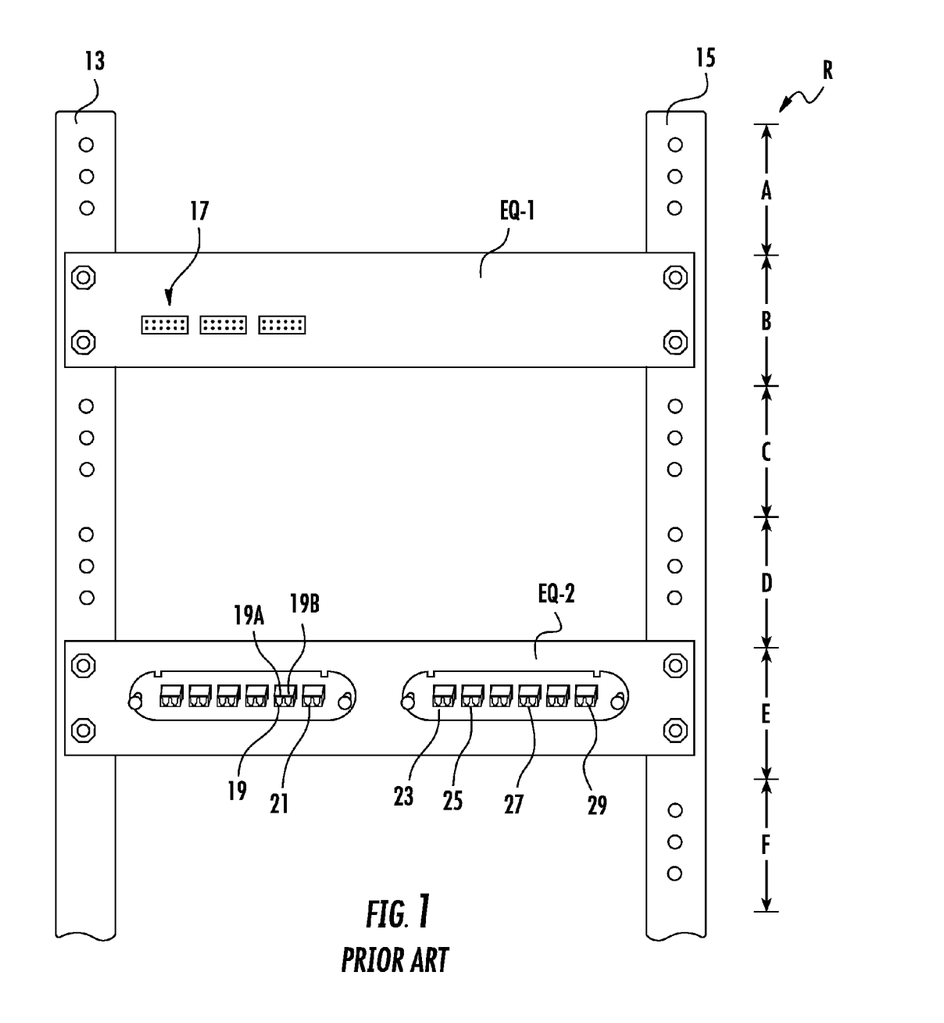
FIG. 1 is a front view of a network rack illustrating equipment with desired ports for connection, in accordance with the prior art.

FIG. 1 shows a network rack R, in accordance with the prior art. Networking equipment EQ is mounted between a first rail 13 and a second rail 15. The first rail 13 may be spaced from the second rail 15 by a fixed distance, like 19 inches (about 48 centimeters) or 23 inches (about 58.5 centimeters). Typically, the height dimension of the rack R is divided into intervals, such as rack units (e.g., A, B, C, D, E, F, . . . ). Each rack unit (or "U") may be defined as about 1.75 inches (about 4.5 centimeters).

FIG. 1 illustrates a piece of network equipment EQ-1 mounted in the rack level B position, and a piece of network equipment EQ-2 mounted in the rack level E position. Equipment EQ-1 has several twelve fiber MPO ports on its face, and here it is assumed that a connection is desired to be formed with a first, twelve fiber MPO port 17.

Equipment EQ-2 has multiple duplex LC ports on its face. In this example, it is assumed that connections need to be made with six duplex LC ports 19, 21, 23, 25, 27 and 29 on equipment EQ-2. For purposes of illustration, the twelve fiber termination within the single MPO port 17 might present six sets of transmit/receive channels. Equipment EQ-2 might be a connection panel for individual server connection ports, e.g., where duplex port 19 presents a transmit port 19A and a receive port 19B for a first server.

Figure 2:
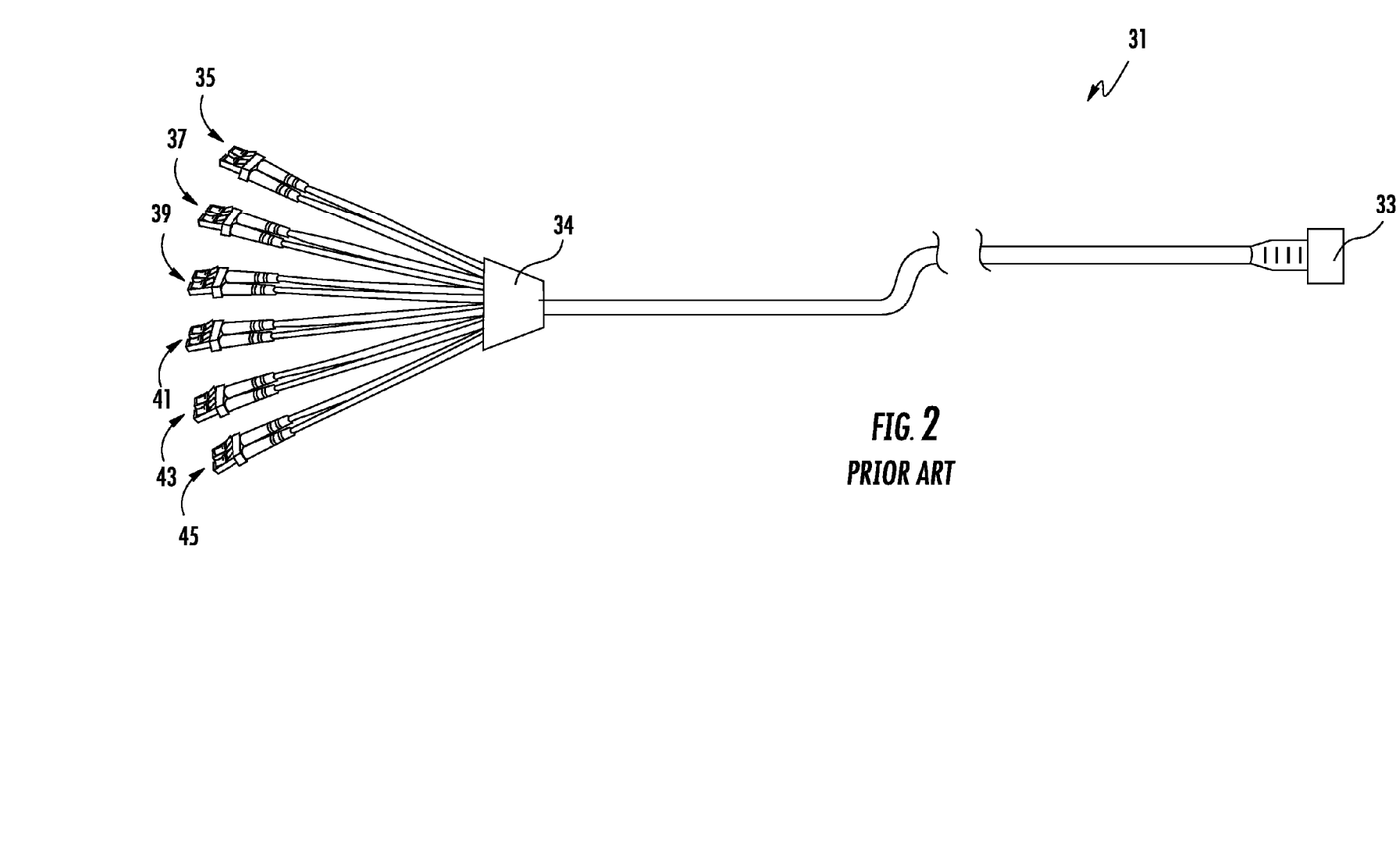
FIG. 2 is a perspective view of a breakout cable, in accordance with the prior art.

Next, with reference to FIGS. 2-3, a first prior art structure to make the connections between equipment EQ-1 and EQ-2 will be described. FIG. 2 shows a prior art, breakout cable 31, sometimes referred to as a fan-out cable. The breakout cable 31 has a twelve fiber MPO connector 33 at a first end, a molded transition region 34 near the middle, and six duplex LC connectors 35, 37, 39, 41, 43 and 45 at the opposite, second end of the breakout cable 31.

Figure 3:
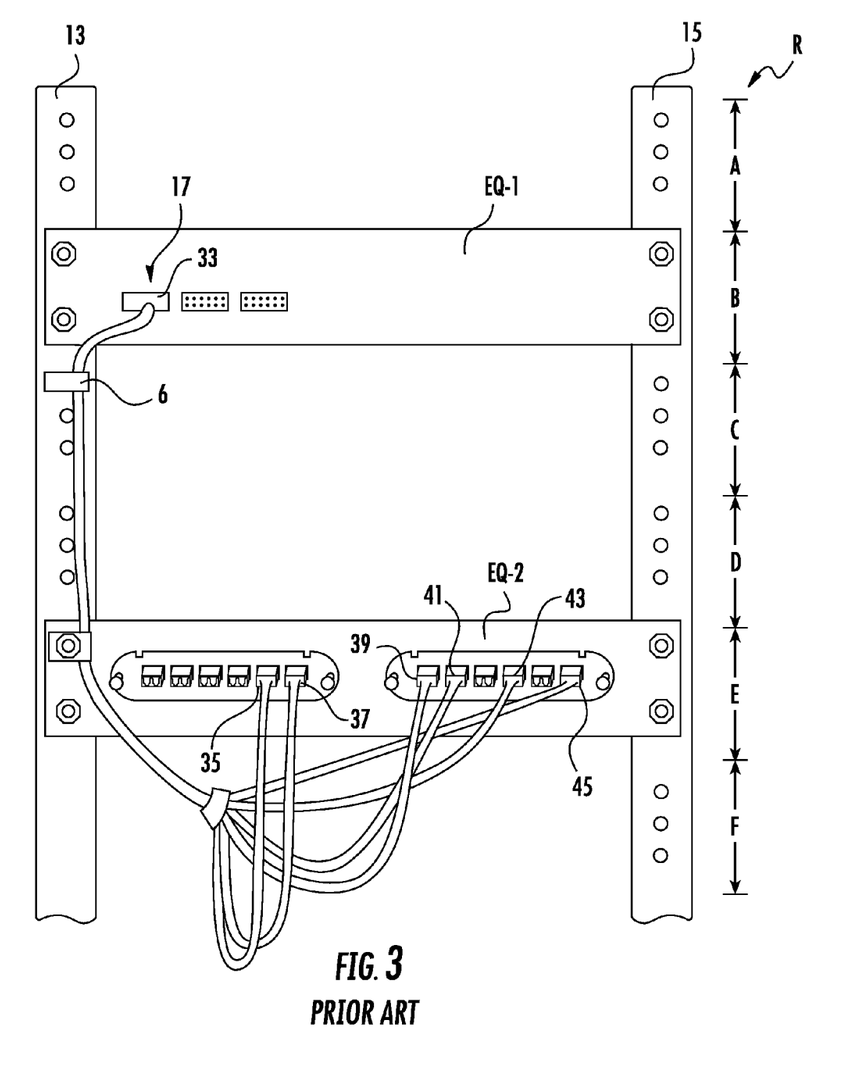
FIG. 3 is a front view of a network rack illustrating a first prior art solution for making the desired port connections using the breakout cable of FIG. 2, in accordance with the prior art.

FIG. 3 illustrates the employment of the breakout cable 31 of FIG. 2 to make the desired connections between equipment EQ-1 and EQ-2. The MPO connector 33 is connected to the MPO port 17 of equipment EQ-1. The duplex LC connectors 35, 37, 39, 41, 43 and 45 are connected to the duplex LC ports 19, 21, 23, 25, 27 and 29 of equipment EQ-2 of FIG. 1.

Figure 4:
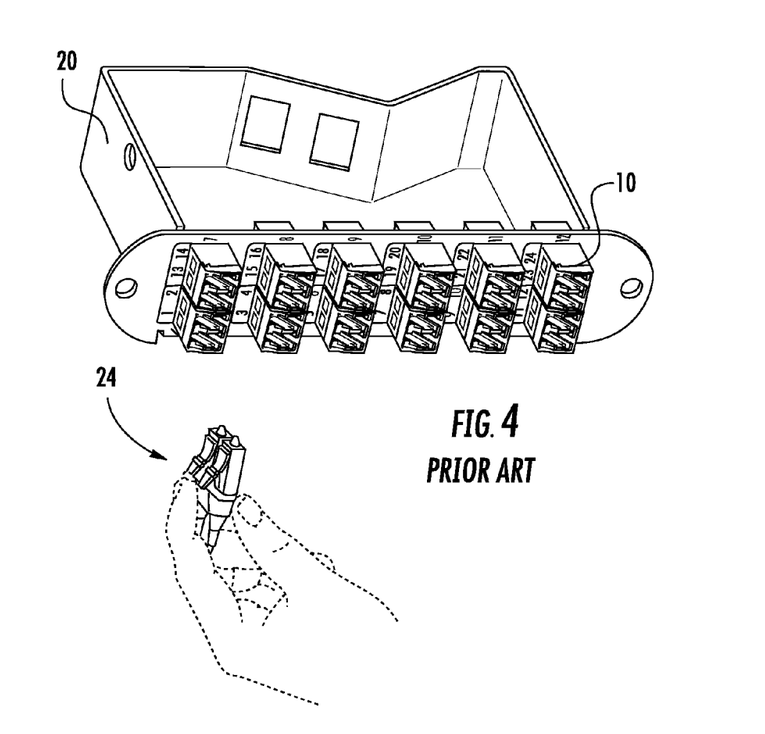
FIG. 4 is perspective view of a breakout module, in accordance with the prior art.
Figure 5:
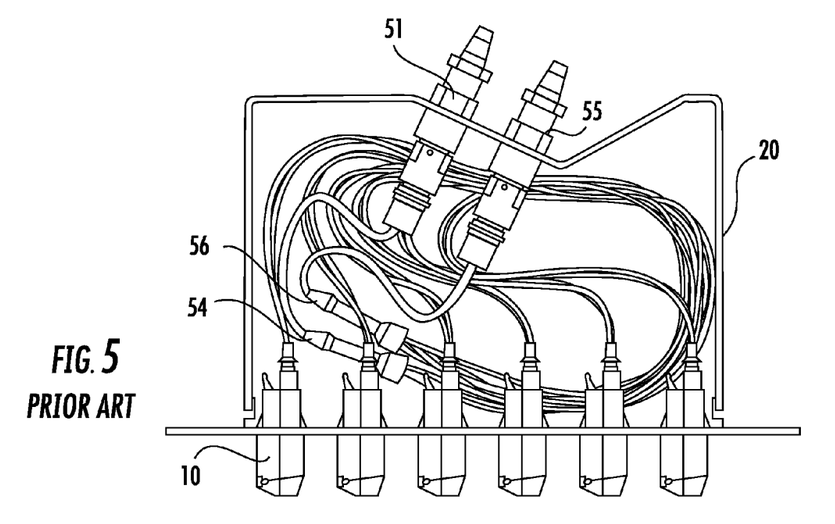
FIG. 5 is top view of the breakout module of FIG. 4, illustrating the population of the breakout module with first and second breakout cables, in accordance with the prior art.

Next, with reference to FIGS. 4-6, a second prior art structure to make the desired connections between equipment EQ-1 and EQ-2 will be described. FIGS. 4 and 5 illustrate a breakout module 20. A front face of the breakout module 20 has twelve duplex LC ports 10, each of which can accept a duplex LC connector 24. The breakout module 20 has a first twelve fiber MPO port 51 and a second twelve fiber MPO port 55 on its back side. First and second breakout cables, with first and second transition regions 54, 56 (like transition region 34 in FIG. 2) interconnect the first and second MPO ports 51 and 55 to groups of six duplex LC ports 10, respectively. More detail concerning the breakout module 20 can be found in US published application 2010/0322576, which is herein incorporated by reference.

Figure 6:
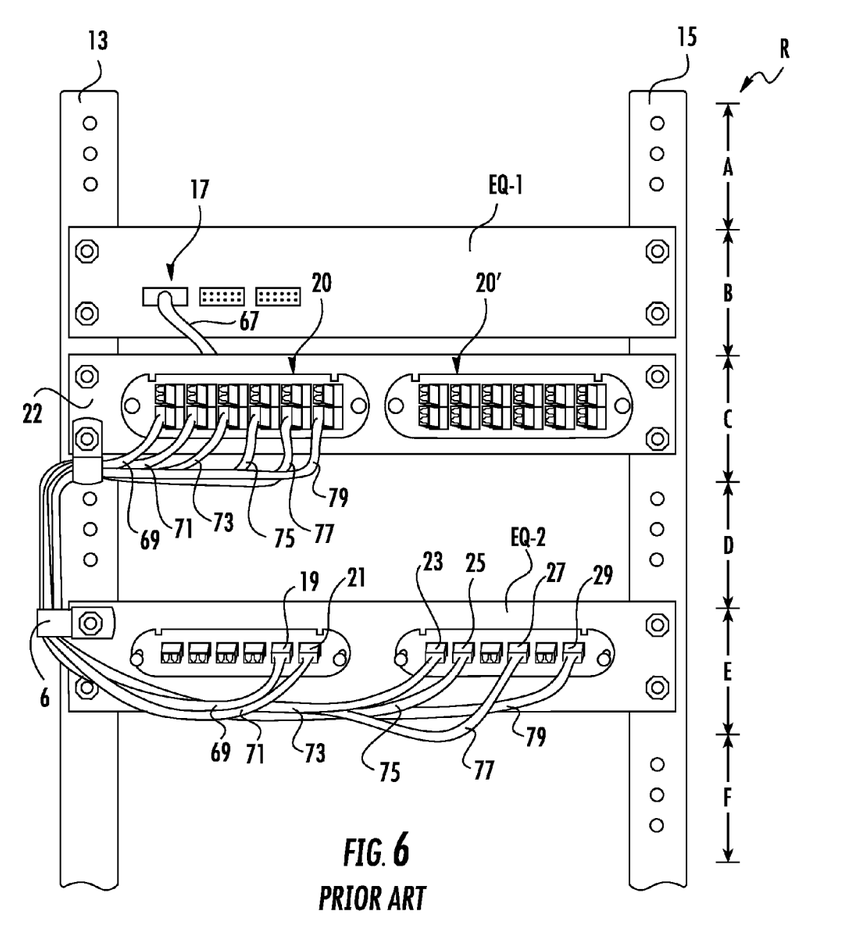
FIG. 6 is a front view of a network rack illustrating a second prior art solution for making the desired port connections using the breakout module of FIGS. 4 and 5, in accordance with the prior art.

FIG. 6 illustrates the employment of the breakout module 20 to achieve the desired connections between the equipment EQ-1 and the equipment EQ-2 of FIG. 1. In FIG. 6, first and second breakout modules 20 and 20' have been mounted within a frame 22 secured to the first and second rails 13 and 15. A first MPO to MPO patch cord 67 connects MPO port 17 of equipment EQ-1 to MPO port 51 on the backside of the breakout module 20. First through sixth duplex LC patch cords 69, 71, 73, 75, 77 and 79 connect the first through sixth duplex LC ports of the breakout module 20 to the first through sixth duplex LC ports 19, 21, 23, 25, 27 and 29 on equipment EQ-2.

SUMMARY OF THE INVENTION

The Applicant has appreciated one or more drawbacks of the cable designs of the prior art.

The connection system illustrated in FIG. 3 has several disadvantages. As illustrated, the cables on the left side sag more than the cables at the right side. The sagging cables hang over other parts of the network rack covering portions of ports and equipment, which can block labeling and make cord connections and tracing more difficult. Also, the sagging cordage leads to a disorganized appearance of the networking equipment. Also, suppose the six LC duplex ports 19, 21, 23, 25, 27 and 29, which were desired to be connected to, were located on the right side of rack level F. The breakout cable 31 of FIG. 2 would be insufficient in length. Therefore, the technician needs to stock and carry multiple lengths of break out cables 31 in order to deal with varying networking situations.

The connection system illustrated in FIG. 6 has advantages and disadvantages. First, the breakout cable 31 is no longer required. Hence, the disadvantages of sagging cables, as depicted in FIG. 3, can be avoided by using individual patch cords of varying lengths. The desired connections can be made using simple patch cords, such as a single MPO-to-MPO patch cord 67 and six patch cords 69, 71, 73, 75, 77 and 79 of the duplex LC-to-duplex LC type. Technicians typically carry patch cords of varying lengths, and would no longer need to carry breakout cords 31 of various lengths. By using patch cords of varying length, the cordage may be kept orderly, thus avoiding the sagging cordage of FIG. 3. One drawback is that the breakout module 20 must be supported within a bracket 22 attached to the network rack R. Hence, the connection solution of FIG. 6 requires network rack space, such as a one U requirement.

It is an object of the present invention to address one or more of the drawbacks, which the Applicant has appreciated in the prior art.

It is an object of the present invention to provide a connection solution which avoids the sagging cordage depicted in FIG. 3, and which does not require rack space, e.g., a zero U requirement.

These and other objects are accomplished by a breakout module which includes a substantially cylindrical body having a first end face and an opposite, second end face. A multi-fiber port, like an MPO port, is provided within the first end face, or a cord having a multi-fiber connector, like an MPO connector, attached to its distal end exits the first end face. Plural duplex fiber ports are disposed within the second end face. A breakout cable is disposed within the body and connects the plural duplex fiber ports of the second end face to the multi-fiber port or connector associated with the first end face.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limits of the present invention, and wherein.

DETAILED DESCRIPTION OF A PREFERRED EMBODIMENT

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 7:
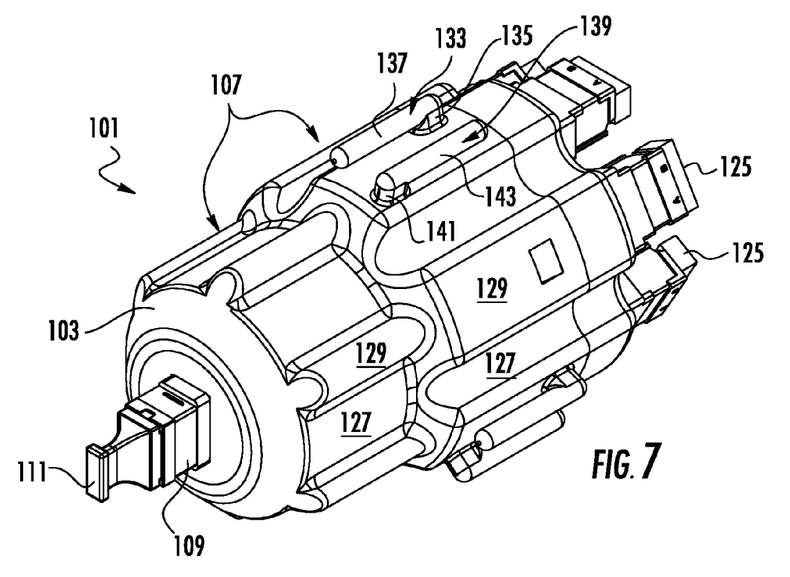
FIG. 7 is a front perspective view of a breakout module, in accordance with a first embodiment of the present invention.
Figure 8:
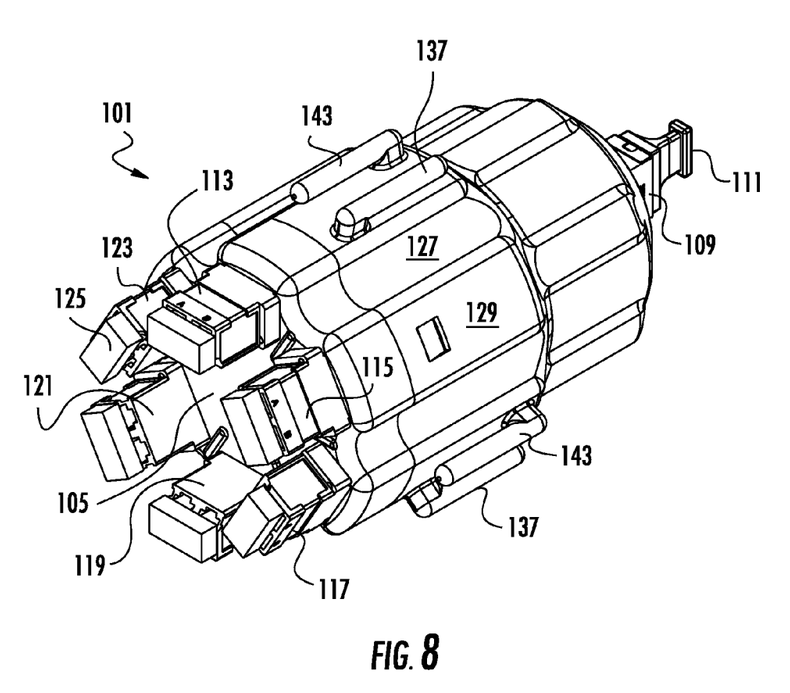
FIG. 8 is a rear perspective view of the breakout module of FIG. 7.
Figures 9, 10, 11:
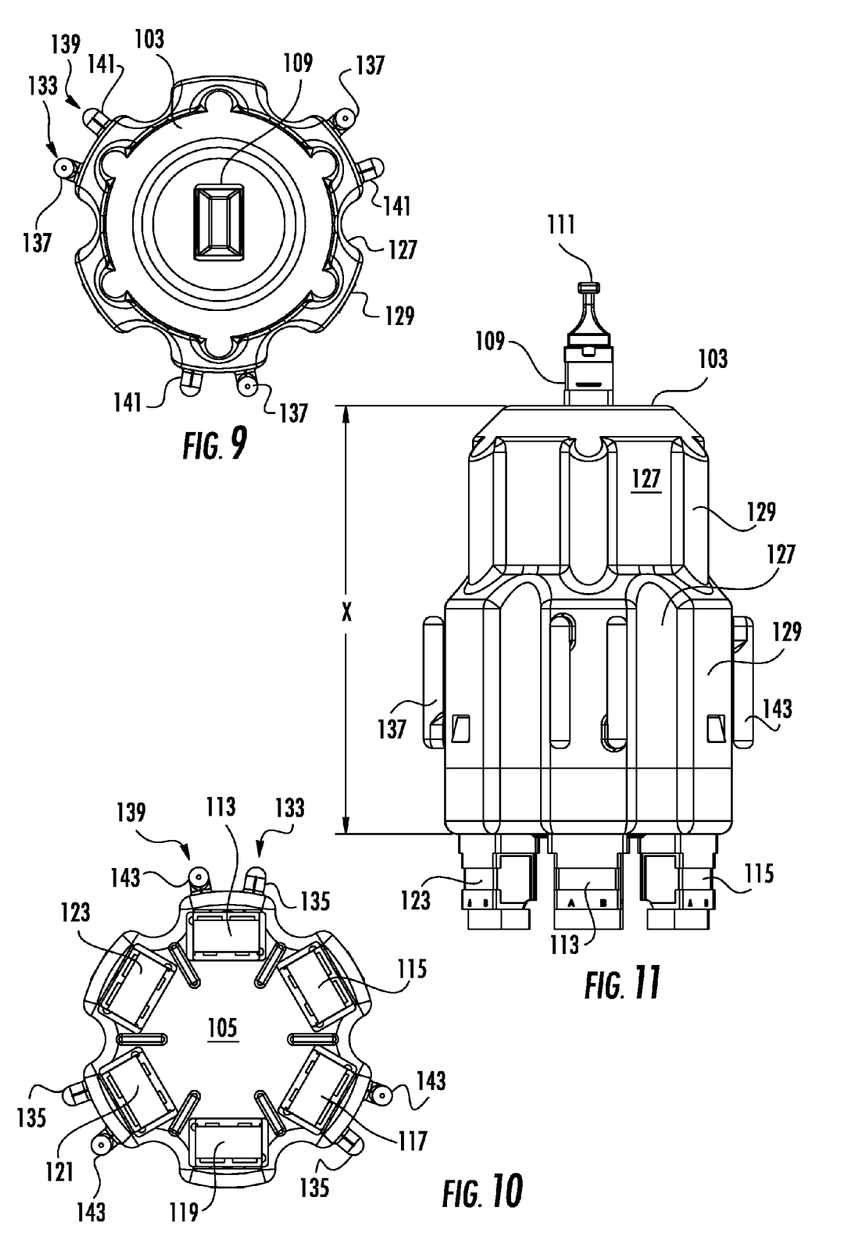
FIG. 9 is top view of the breakout module of FIG. 7.
FIG. 10 is a rear view of the breakout module of FIG. 7.
FIGS. 11 and 12 are side views of the breakout module of FIG. 7.
Figure 12:
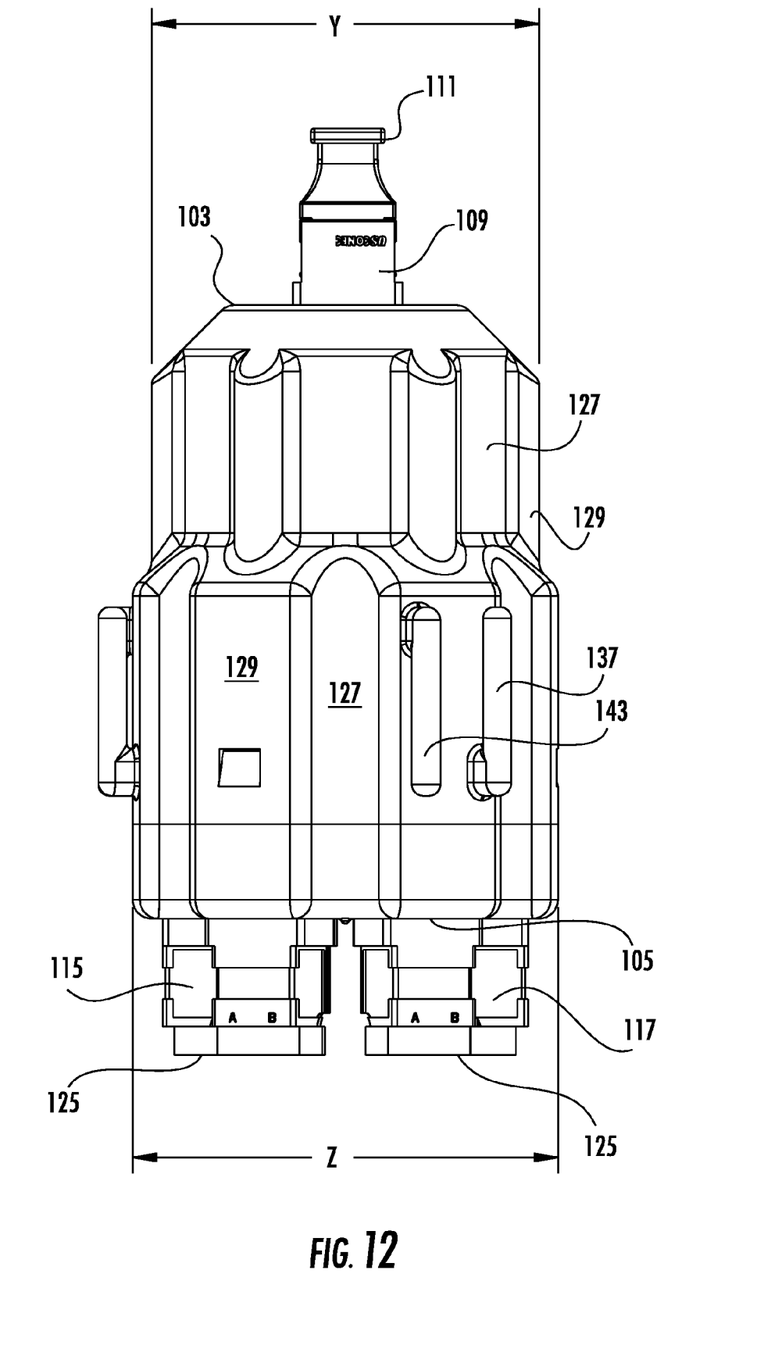

FIGS. 7 and 8 are front and rear perspective views, respectively, of a zero U fiber distributor, otherwise known as an MPO fanout or MPO breakout module 101 in accordance with the present invention. FIGS. 9 and 10 are front and rear views, respectively, of the module 101, in accordance with the present invention. And, FIGS. 11 and 12 are side views of the module 101, in accordance with the present invention.

The module 101 includes a front face 103 and a rear face 105. The sidewalls 107 form a generally cylindrical shape, but may include additional features, as will be described below.

The front face 103 includes an MPO port 109. In FIGS. 7-9 and 11-12, a dust cap 111 is shown in the MPO port 109. The MPO port 109 is a twelve fiber MPO port, and is constructed in accordance with the prior art. Although an MPO port 109 has been shown, it may be replaced by a pigtail or whip cord, e.g., a twelve fiber cord leaving the front face 103 and terminating to a twelve fiber MPO port or connector at its distal end.

The rear face 105 includes first through sixth duplex LC ports 113, 115, 117, 119, 121 and 123. In FIGS. 7-8 and 10-12, dust caps 125 are illustrated in the six duplex LC ports 113, 115, 117, 119, 121 and 123. The duplex LC ports 113, 115, 117, 119, 121 and 123 are also constructed in accordance with the prior art, e.g., sized according to standards, so as to accept a standard duplex LC connector. Although duplex LC ports are illustrated, it should be understood that other ports could be provided on the rear face 105, such as SC ports. A length of the module 101 from the front face 103 to the rear face 105 is five inches or less (about 12.7 centimeters), more preferably about 3.25 inches (about 8.3 centimeters), as illustrated by the dimension X in FIG. 11. In a preferred embodiment, the length dimension is the longest dimension of the module 101, such that no dimension of the module 101 exceeds five inches (about 12.7 centimeters), more preferably no dimension of the module 101 exceeds 3.25 inches (about 8.3 centimeters).

Inside the module 101, the inner side of the twelve fiber MPO port 109 is connected to the inner sides of the six duplex LC ports via a breakout cable in the same manner, or in a similar manner, as the MPO port 51 is connected to the duplex LC ports 10 in the module 20 of FIG. 5.

The generally cylindrical sidewall 107 may optionally include valleys 127 and peaks 129. The valleys 127 and peaks 129 provide structural rigidity to the module 101. Also, when multiple modules 101 are placed adjacent to each other, the peaks 129 of a first module 101 may nest into the valleys 127 of an adjacent, second module 101. A width of the module 101 is three inches (about 7.6 centimeters) or less, more preferably about 2.05 inches (5.2 centimeters) at the top and about 2.25 inches (about 5.7 centimeters) at the bottom, as illustrated by dimensions Y and Z, respectively, in FIG. 12.

In one embodiment of the present invention, the sidewall 107 includes retention features. The retention features may include a first appendage 133 opening toward the front face 103. The first appendage 133 is formed by a short leg 135 extending approximately perpendicular to the sidewall 107 and a long leg 137 extending approximately perpendicular to the short leg 135 (e.g., approximately parallel to the sidewall 107) and pointing in the direction of the front face 103.

The retention features may also include a second appendage 139 opening toward the rear face 105. The second appendage 139 is formed by a short leg 141 extending approximately perpendicular to the sidewall 107 and a long leg 143 extending approximately perpendicular to the short leg 141 (e.g., approximately parallel to the sidewall 107) and pointing in the direction of the rear face 105. In a preferred embodiment, the module 101 includes multiple sets of first and second appendages 133 and 139, such as three sets of first and second appendages 133 and 139, located at twelve o'clock, four o'clock and eight o'clock, as the module is viewed from the rear face 105 (See FIG. 10).

The retention features allow the module 101 to be connected to another structure like a bundle of cables, a network rack rail (13 or 15 in FIGS. 1, 3 and 6), a cable organization clip 6 (See FIGS. 3 and 6), or another module 101. In practice, a hook and loop strap, racketing strap, or similar flexible strap is route behind the long legs 137 and 143 of the first and second appendages 133 and 139. The strap then encircles the cable bundle, rack rail 13 or 15, organization clip 6, or another module 101, before being attached back to itself.

Figure 13:
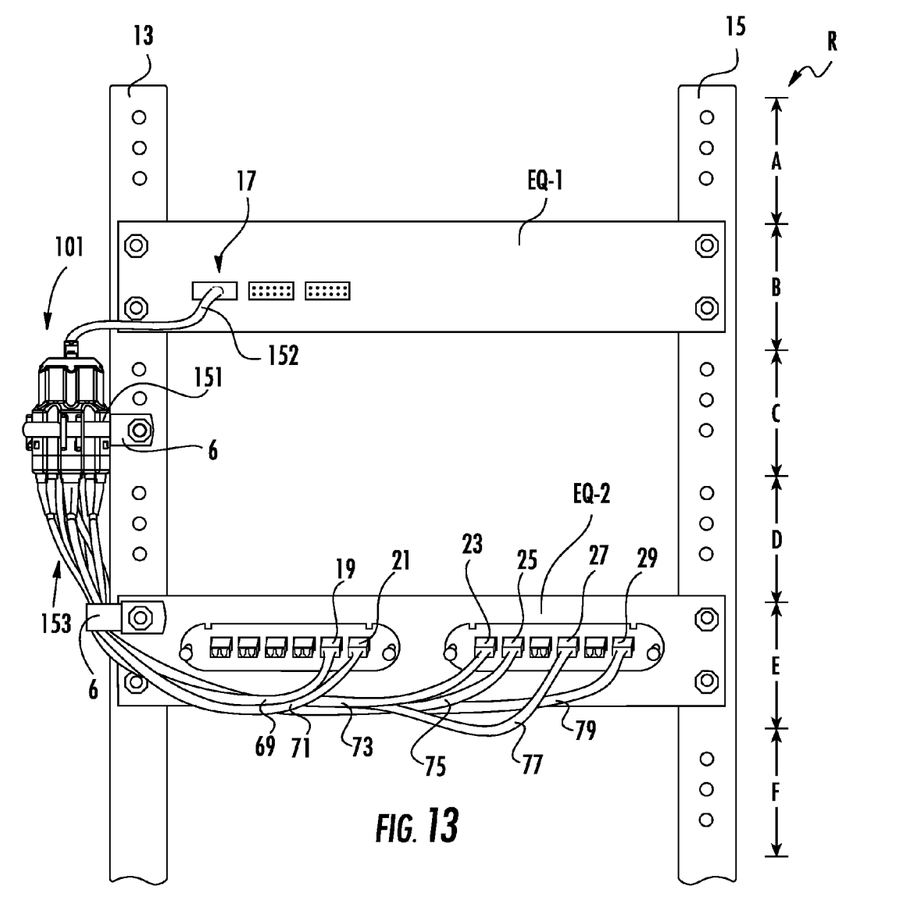
FIG. 13 is a front view of a network rack illustrating a solution for making the desired port connections using the breakout module of FIGS. 7-12, in accordance with the present invention.

FIG. 13 illustrates the module 101 being used to fulfill the desired connections for the equipment EQ-1 and EQ-2 of FIG. 1. As can be seen, a hook and loop strap 151 is used to attach the module 101 to a clip 6 attached to the network rack rail 13. An MPO to MPO patch cord 152 connects MPO port 17 of equipment EQ-1 to the MPO port 109 on the front face 103 of the module 101. Duplex LC to duplex LC patch cords 153 (like patch cords 69, 71, 73, 75, 77 and 79) connect the duplex LC ports 113, 115, 117, 119, 121 and 123 on the rear face 105 of the module 101 to the duplex LC ports 19, 21, 23, 25, 27 and 29 of the equipment EQ-2.

Although FIG. 13 shows the module 101 oriented vertically, the module 101 could be oriented horizontally as well. In practice, the patch cords 69, 71, 73, 75, 77 and 79 may be offered to customers in varying lengths, such as lengths ranging between 12 inches (about 30 centimeters) and 48 inches (about 120 centimeters) in 2 inch (about 5 centimeter) increments (e.g., patch cords with lengths of 12, 14, 16, 18, ... 46 and 48 inches (about 30, 35, 40, 45, ... 115 and 120 centimeters)). Hence, the customer is in effect able to easily and quickly custom tailor the lengths of the fan out legs of a customer configured breakout cable at the job site as the circumstances dictate. No field terminations of fiber are required to complete the custom tailored breakout. As such, the sagging cordage depicted in FIG. 3 may be avoided, while no U space in the network rack is required. The module 101 may be oriented and placed at any position desired by the customer to minimize interference with other network equipment and to present an orderly appearance.

Figure 14:
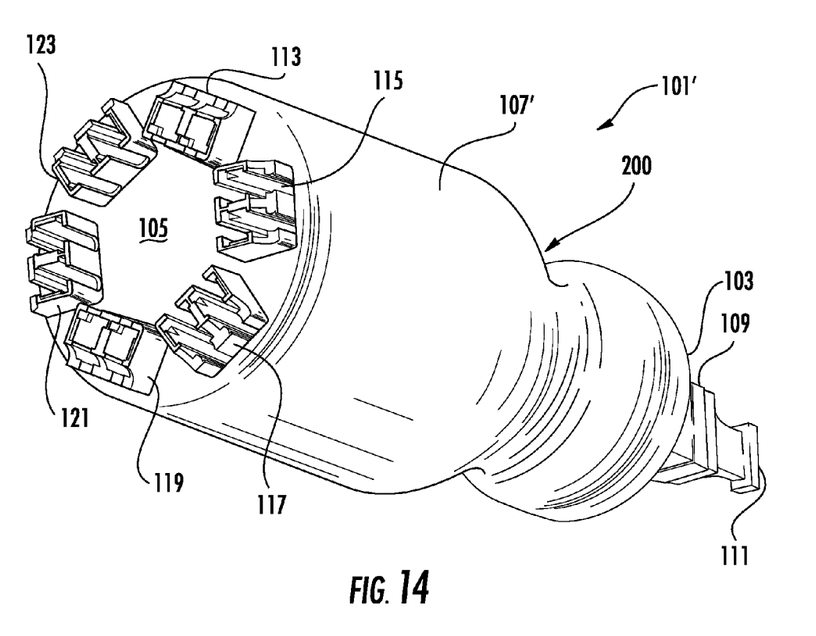
FIG. 14 is a rear perspective view of a breakout module, in accordance with a second embodiment of the present invention.

As illustrated in FIG. 14, the outer sidewalls 107' of the breakout module 101' could be smooth (e.g., lacking the valleys 127 and the peaks 129 of FIGS. 7-13). As also shown in FIG. 14, the breakout module 101' may include a neck-downed portion 200 on the sidewalls 107', which exists closer to the front face 103 (with the MPO port 109) than the rear face 105 (with the duplex LC ports 113, 115, 117, 119, 121 and 123). The neck down portion 200 could be useful for holding a securing strap, like strap 151 in FIG. 13.

Figure 15:
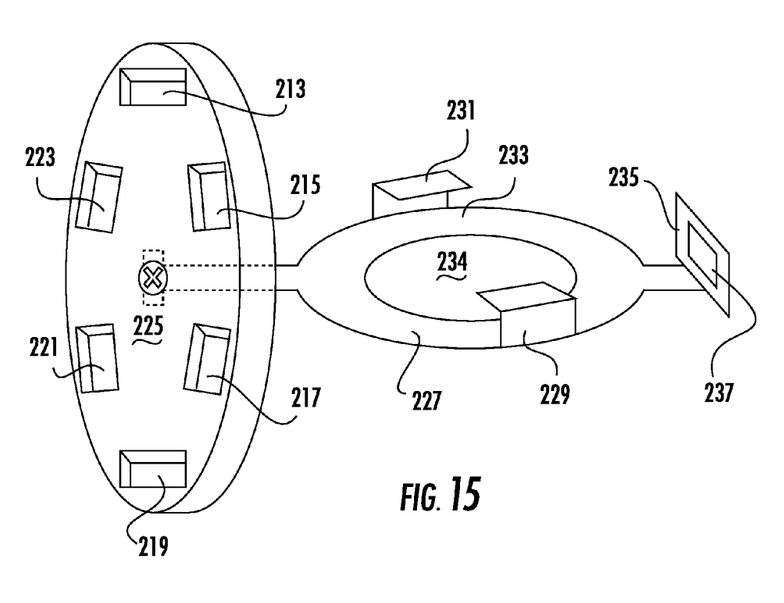
FIG. 15 is a rear perspective view of an optional fiber manager for use inside of the breakout modules of FIGS. 7-14.

FIG. 15 shows a fiber manager 202 which may optionally be included within the breakout module 101 or 101'. The fiber manager 202 can organize the interior fan-out or breakout cable 31 (similar, but shorter than the breakout cable 31 of FIG. 2, such as the fan-out cable presently used in the 360 DM modules marketed by CommScope, Inc. of Hickory, N.C.). The breakout cable 31 extends between the MPO port 109 on the front face 103 of the module 101 or 101' and the six duplex LC ports 113, 115, 117, 119, 121 and 123 on the rear face 105 of the module 101 or 101'.

The fiber manager 202 can ensure that the breakout cable 31 does not exceed its minimum bend radius. In construction, the fiber manager 202 is formed as a generally flat piece 227. In a preferred embodiment, the generally flat piece 227 is formed of sheet metal or plastic. A first end of the generally flat piece 227 is connected to a disc 225, such as by welding, adhesive or a fastener, like a screw. The disc 225 includes six rectangular openings 213, 215, 217, 219, 221 and 223, spaced about its perimeter.

A second end of the generally flat piece 227 includes a flat end plate 235 with a rectangular opening 237 formed therethrough. In a preferred embodiment, the flat end plate 235 is a bent up portion, integrally formed with the generally flat piece 227. A circular raceway 233 is disposed in the middle of the generally flat piece 227 and a hole 234 is optionally included in the center of the circular raceway 233. First and second inwardly turned ears 229 and 231 are provided at the flanks of the circular raceway 233. In a preferred embodiment, the inwardly turned ears 229 and 231 are bent up portions, integrally formed with the generally flat piece 227.

In use, the fiber manager 202 is placed inside the module 101 or 101'. The flat end plate 235 is located behind the front face 103 of the module 101 or 101', and the MPO port 109 extends through the rectangular opening 237 in the flat end plate 235. The disc 225 is located behind the rear face 105, and the six duplex LC ports 113, 115, 117, 119, 121 and 123 extend through the six rectangular openings 213, 215, 217, 219, 221 and 223.

The breakout cable 31 leaving the backside of the MPO port 109 (interior to the module 101 or 101') is routed to the circular raceway 233. The breakout cable 31 then travels in loops about the circular raceway 233, such that the molded transition region 34 of the breakout cable 31 resides along the circular raceway 233 and portions of the six duplex LC breakout cables leaving the molded transition region 34 reside along the circular raceway 233. The six LC breakout cables from the molded transition region 34 then leave the circular raceway 233 and terminate to the backsides of the six duplex LC ports 113, 115, 117, 119, 121 and 123 extended through the six rectangular openings 213, 215, 217, 219, 221 and 223 in the disc 225 (interior to the module 101 or 101'). The first and second inwardly turned ears 229 and 231 assist in keeping the loops of the breakout cable 31 on the circular raceway 233.

Figure 16:
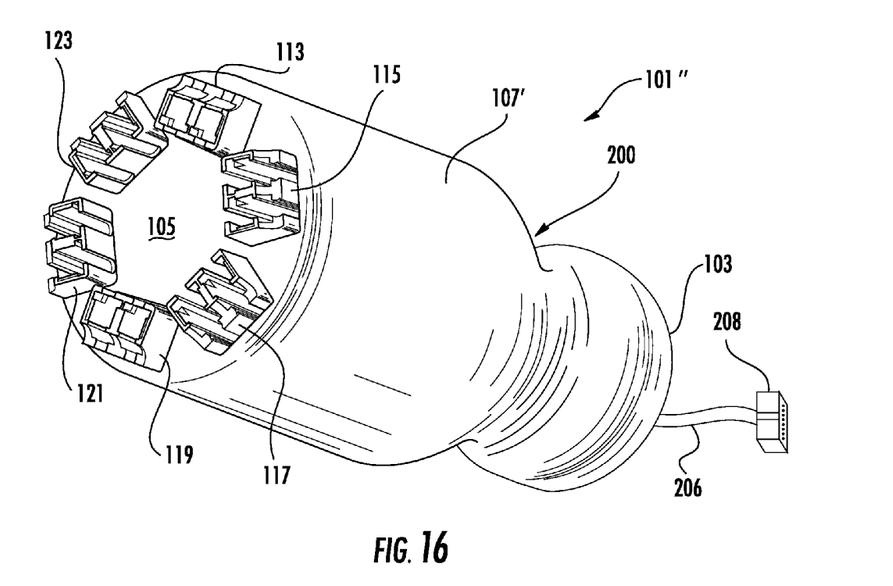
FIG. 16 is a rear perspective view of a breakout module, in accordance with a third embodiment of the present invention.

FIG. 16 illustrates that the MPO port 109 may be replaced with a pigtail cord 206, also referred to as an MPO whip cord. The distal end of the pigtail cord 206 may include a male or female MPO connector 208. The module 101'' of FIG. 16 may also include a seal for a glanded pigtail cord 206, so as to keep moisture and/or debris from entering the module 101''' at the entrance of the pigtail cord 206.

The description above has detailed a twelve fiber MPO port 109, or twelve fiber MPO connector 208 at the end of a whip cord 206, being split out into six duplex LC ports 113, 115, 117, 119, 121 and 123 on the rear face 105. However, it should be appreciated that other configurations are possible. For example, an eight fiber port on the front face 103, or eight fiber connector at the end of the whip cord 206, could be fanned out to four duplex LC ports on the rear face 105. As another example, a ten fiber port on the front face 103, or ten fiber connector at the end of the whip cord 206, could be fanned out to five duplex SC ports (as opposed to LC ports) on the rear face 105.

The external color of the module 101, 101' or 101'' can be any variety of colors. In accordance with one embodiment of the present invention, the coloring of the body of the module 101, 101' or 101'' serves the useful function of an indicator of the fiber speed or other performance characteristics. For example, the body of the module 101, 101' or 101'' may be formed of a plastic of the colors of red, blue, yellow, etc. Optionally, the body of the module 101, 101' or 101'' may be of a uniform color (e.g., white) and a colored band may be sandwiched between (or painted on or formed into) the top and/or bottom portions of the module 101, 101' or 101''. The colored band would indicate the fiber type (e.g., aqua for LazrSpeed, yellow for TeraSpeed).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A breakout module comprising:
 a substantially cylindrical body having a first end face and an opposite, second end face;
 a multi-fiber port within said first end face, wherein said multi-fiber port is adapted to mate with a multi-fiber connector;
 a plurality of fiber ports within said second end face, wherein said plurality of fiber ports are adapted to mate with a plurality of fiber connectors; and
 a breakout cable within said body connecting said multi-fiber port of said first end face to said plurality of fiber ports of said second end face.

2. The breakout module of claim 1, wherein said plurality of fiber ports consists of six duplex LC ports, and wherein said multi-fiber port is a twelve fiber MPO port.

3. The breakout module of claim 2, wherein said six duplex LC ports are arranged around a perimeter of said second end face in a symmetrical manner.

4. The breakout module of claim 1, wherein sidewalls of said body include retention features for holding a securing strap.

5. The breakout module of claim 4, further comprising:
 a securing strap passing around said sidewalls, interacting with said retention features of said sidewalls and securing said breakout module to a rack rail.

6. The breakout module of claim 1, wherein a length of said breakout module from said first end face to said second end face is less than 5 inches.

7. The breakout module of claim 1, wherein at least portions of sidewalls of said body extending between said first end face and said second end face include valleys and peaks.

8. A rack mounted breakout module comprising:
 a first rack rail mounted a predetermined distance from a second rack rail so as to support networking equipment between said first and second rack rails;
 a housing mounted to only one of said first and second rack rails, said housing including a first face and a second face;
 said first face being associated with a multi-fiber connector or port;
 a plurality of fiber ports within said second face; and
 a breakout cable within said housing connecting said multi-fiber connector or port associated with said first face to said plurality of fiber ports of said second face.

9. The breakout module of claim 8, wherein said housing has no dimension exceeding 5 inches.

10. The breakout module of claim 8, wherein said first face includes a multi-fiber MPO port fixed thereto.

11. The breakout module of claim 8, wherein said first face includes a multi-fiber cord exiting therefrom and terminating to a multi-fiber MPO connector at its distal end.

12. The breakout module of claim 8, wherein said plurality of fiber ports within said second face include plural duplex ports, and wherein said multi-fiber connector or port associated with said first face is of the MPO type.

13. The breakout module of claim 12, wherein said plural duplex ports are of the LC or SC type.

14. The breakout module of claim 8, wherein said housing has no dimension exceeding 3.25 inches.

15. The breakout module of claim 8, wherein sidewalls of said housing include retention features for holding a securing strap, which connects said housing to said one of said first and second rack rails.

16. The breakout module of claim 8, wherein a color of said breakout module represents the speed of the fibers employing said breakout module.

17. The breakout module of claim 8, wherein said housing is formed as a substantially cylindrical body, said first face forms a first end face of said substantially cylindrical body and said second face forms an opposite, second end face of said substantially cylindrical body.

18. The breakout module of claim 17, wherein said plurality of fiber ports within said second face include six duplex ports arrangement around a perimeter of said second end face in a symmetrical manner.

\* \* \* \* \*